United States Patent [19]

Ohman

[11] Patent Number: 4,586,331

[45] Date of Patent: May 6, 1986

[54] AUTOMATIC HYDRAULIC SPEED CONTROL

[75] Inventor: Donald M. Ohman, Mentor, Ohio

[73] Assignee: Caterpillar Industrial Inc., Mentor, Ohio

[21] Appl. No.: 710,342

[22] Filed: Apr. 24, 1985

Related U.S. Application Data

[63] Continuation of Ser. No. 498,365, May 26, 1983, abandoned.

[51] Int. Cl.⁴ .............................................. F15B 11/02
[52] U.S. Cl. ....................................... 60/422; 60/427; 60/433; 60/911
[58] Field of Search ................. 60/422, 423, 427, 420, 60/431, 484, 911, 433; 318/139, 305, 313, 480

[56] References Cited

U.S. PATENT DOCUMENTS

| | | | |
|---|---|---|---|
| 3,614,567 | 10/1971 | Payne et al. | 318/305 |
| 3,968,414 | 7/1976 | Konrad | 318/139 |
| 4,102,132 | 7/1978 | Palmer | 60/484 |
| 4,120,233 | 10/1978 | Heiser et al. | 60/911 |
| 4,369,625 | 1/1983 | Izumi et al. | 60/422 |
| 4,386,301 | 5/1983 | Neki et al. | 318/313 |

FOREIGN PATENT DOCUMENTS 71228 2/1983 European Pat. Off. .............. 60/422

Primary Examiner—Charles T. Jordan
Assistant Examiner—Richard Klein
Attorney, Agent, or Firm—Terry D. Morgan

[57] ABSTRACT

A microprocessor (158) based control for a hydraulic pump motor (26) used to control the operation of a mast assembly (12) on a work vehicle (10). The speed of each function performed by the mast assembly (12) is programmable to one of a plurality of possible speeds. An additional function for performing lifting of the mast (12) produces incremental speed variations relative to incremental movement of a corresponding control lever (14). Each of the functions have a predetermined priority such that attempted operation of multiple functions results in a pump motor speed requested by the function of highest priority.

10 Claims, 5 Drawing Figures

AUTOMATIC HYDRAULIC SPEED CONTROL

This is a continuation of Ser. No. 498,365, filed 5-26-83 now abandoned.

DESCRIPTION

1. Technical Field

This invention relates generally to a control for operation of hydraulically driven attachments to a work vehicle and more particularly to an apparatus for controlling the speed of a motor driving a hydraulic pump of a fork lift truck.

2. Background Art

Work vehicles, for example lift trucks, are normally associated with a variety of hydraulically operated implements capable of performing a wide range of functions. Each of these functions have an optimum operating speed or range of speeds varying over a wide spectrum. For example, a lift function is required to operate over a range of speeds proportional to incremental movement of its associated control lever, while a tilt function is capable of operating efficiently at a single slower speed.

Prior art has shown that the varied speeds required can be obtained by controlling the rate of hydraulic fluid flow. Fluid flow has been controlled by varying the speed of the motor driving the hydraulic pump through the use of an analog control system. This system, though at one time state of the art, is now seriously outdated by its analog design techniques, and is not as reliable, cost-effective, fast, or space-saving as it might be if it encompassed digital design technology. Moreover, the prior system employs the use of inherently short-lived components, such as variable resistors. The system is also not software programmable and thus, not easily adaptable to a number of different vehicles.

The present invention is directed to overcoming one or more of the problems as set forth above.

DISCLOSURE OF THE INVENTION

In one aspect of the present invention, a work vehicle has a plurality of work elements and associated control elements. Each of the work elements has a respective preselected priority. A controllable motor is connected to a pump to supply power to the work elements. Means is provided for delivering a respective control signal in response to actuating its respective control. Means is also included for allowing only the control signal of highest priority to be passed to a means for converting the passed signal to a preselected digital signal. Another means is available for controlling the speed of the pump motor in response to receiving the digital signals.

The automatic motor control is adapted for use in combination with hydraulic implements associated with work vehicles. The automatic motor control delivers a digital signal representative of motor speed to a programmed data processor in response to actuation of each control element. These functions are accomplished through the use of digital design technology, thereby avoiding many of the inherent disadvantages associated with analog or hydraulic motor control systems. For example, prior art required the use of variable resistors in its control scheme. These resistors are subjected to a harsh environment and, consequently, a shorter life expectancy than the electronics involved in the prior control system. The present invention replaces the variable resistors with simple switches and non-contacting sensors. The present invention also employs the use of a programmable data processor which adapts the control system to be used on a wide range of vehicles simply by making a software change.

BRIEF DESCRIPTION OF THE DRAWINGS

For a better understanding of the present invention, reference may be had to the accompanying drawings in which.

BEST MODE FOR CARRYING OUT THE INVENTION

Figure 1:
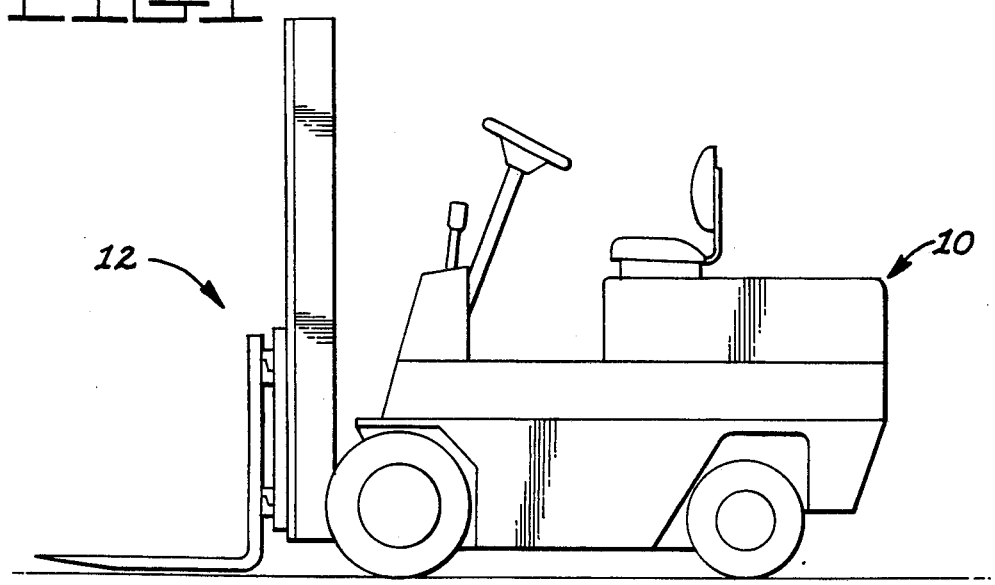
FIG. 1 is a schematized view of a lift truck incorporating the present invention.
Figure 2:
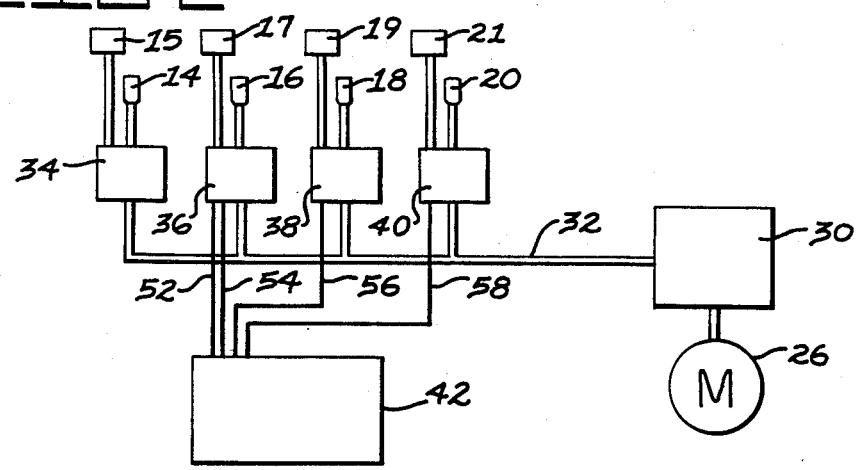
FIG. 2 is a block diagram of the present invention.

Referring to FIGS. 1 and 2, a work vehicle 10, for example a fork lift truck, has a mast assembly 12 and associated control levers 14,16,18 and 20.

The first control lever 14 can be used to proportionally control the lifting function of the mast in two directions. Actuating the control lever 14 in a first direction causes the mast to move in a first direction at a speed proportional to the distance the control lever 14 has been moved. Similarly, actuating the control lever 14 in a second direction, opposite to the first direction, causes the mast to move in a second direction at a speed proportional to the distance the control lever 14 has been moved. The control lever 16 can be a bidirectional control for the tilt function of the mast 12.

Movement of the control lever 16 in a forward or reverse direction produces a corresponding forward or reverse tilting of the mast assembly 12 relative to the work vehicle 10. The control levers 18 and 20 can be used to control a variety of functions, for example, side shifters, rotators, clamps, or other specialized functions. Although four control levers are shown, a greater or lesser number may be used with this invention as desired. Further, the direction of lever movement can be different than as set forth herein without departing from this invention.

Each of the control levers 14,16,18 and 20 has a respective preselected priority. In the operation of the mast assembly 12, each of the functions performed has a speed or range of speeds at which that function is most efficiently and desirably performed. There is no single speed at which all functions can be adequately operated and in fact, a broad spectrum of speeds are necessary for satisfactory performance. Therefore, it becomes necessary to control which speed is selected when more than one of the control levers 14,16,18 and 20 is actuated at the same time. In this embodiment, the function requiring the slowest speed is given the highest priority. Accordingly, it follows that the higher the speed the function requires, the lower the priority.

A controllable electric motor 26 is connected to a pump 30 to supply fluid flow to a plurality of power means 15,17,19 and 21. For example, the power means 15,17,19 and 21 can be hydraulic cylinders which are positioned so as to accomplish the described functions. Fluid flow is delivered over a line 32 to a plurality of valves 34,36,38 and 40 which are controlled by the control levers 14,16,18 and 20. Each of these control levers 14,16,18 and 20 are associated with a respective power means 15,17,19 and 21.

In addition to supplying fluid flow, the control levers 16,18 and 20 also provide a means 42 for delivering a respective control signal in response to actuating a respective control. The means 42, better shown in FIG. 3, includes a plurality of switches 44,48 and 50 which are respectively operated in response to actuation of the control levers 16,18 and 20 in a first direction with the tilt control lever 16 additionally operating a second switch 46 when actuated in a second direction.

The switches 44,46,48 and 50 each have one pole connected to ground and the other pole connected to lines 52,54,56 and 58, respectively. The lines 52,54,56 and 58 each have respective pull up resistors R62,R63,R64 and R65, diodes D27,D28,D29 and D32, current limiting resistors R78,R79,R80 and R81, and capacitors C23,C24,C25 and C26. Each of the lines 52,54,56 and 58 is connected to a means 60 for receiving the control signal, passing the control signal of the control lever having the greatest priority, and blocking all other received control signals.

Blocking of the control signals is achieved by a first plurality of logic gates 64. Each gate has at least one input connected to the signal means 42 and an output connected to a converting means 62. Prioritizing the control signals is accomplished by a second plurality of logic gates 74. A portion of these logic gates each has an output connected to at least one of the first logic gates 64, and an input connected to at least one of the signal means 42. In this embodiment, the first logic gates 64 are a plurality of two input NOR gates 66,68,70 and 72. Each has one input respectively connected to one of the lines 52,54,56 and 58. Each of the NOR gates 66 and 68 have both of their inputs connected to one of the respective lines 52 and 54. In this way, a signal is always delivered to the converting means 62 when the tilt control lever is actuated, thereby assigning the highest priority to the tilt function. The NOR gates 70 and 72 each have their second input connected to the second plurality of logic gates 74. Specifically, the output of NAND gate 76 is connected to the second input of the NOR gate 70 and the output of NAND gate 80 is connected to the second input of the NOR gate 72. Inputs to the NAND gate 76 are from the lines 52 and 54 and its output is also connected to both inputs of a NAND gate 78. The line 56 and the output of the NAND gate 78 serve as inputs to the NAND gate 80. The output of the NAND gate 80 is additionally connected to both inputs of a NOR gate 82, whose output serves as one input to a NAND gate 84. The second input to NAND gate 84 is connected to the line 58.

Figure 4:
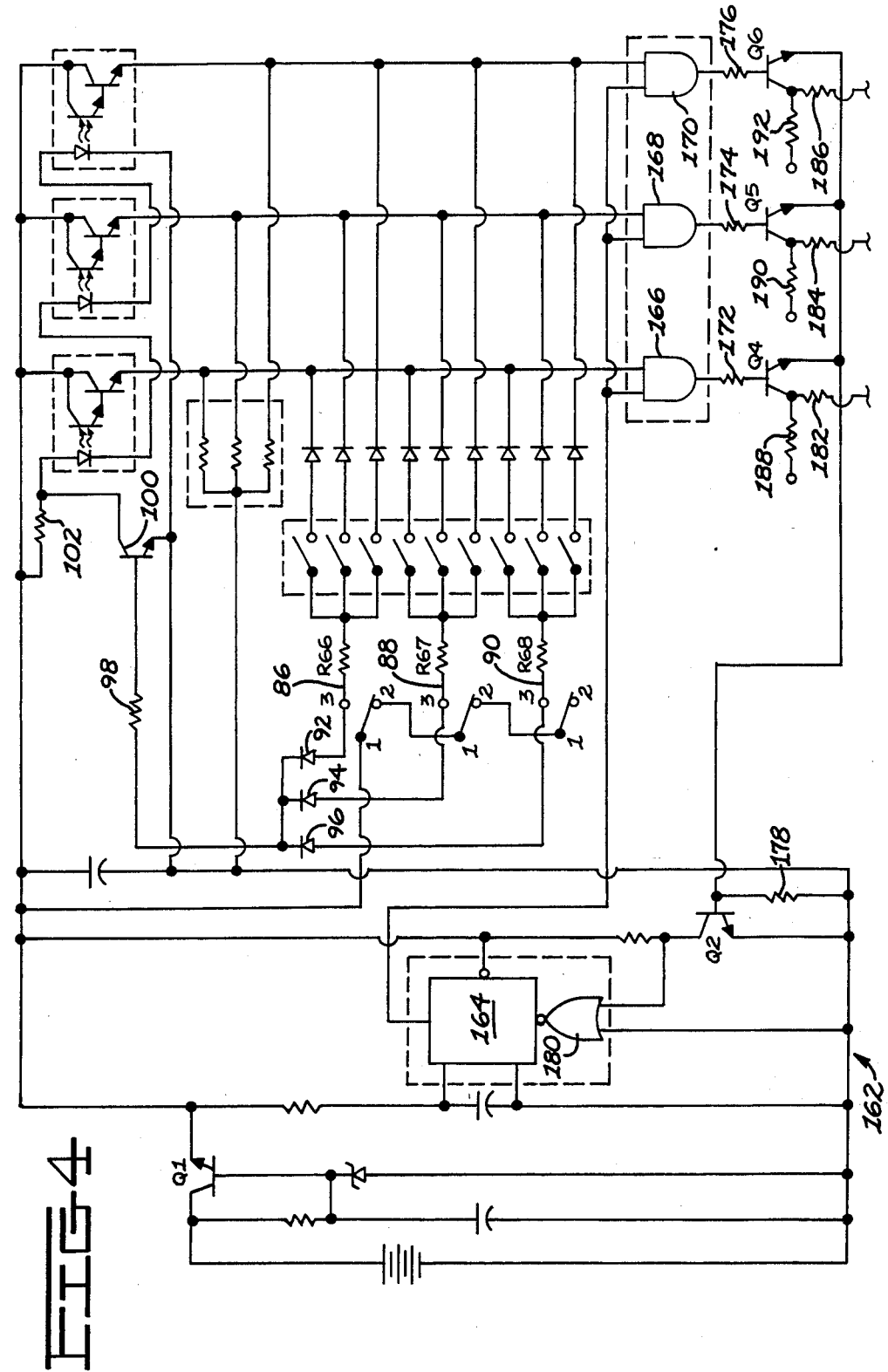
FIG. 4 is a diagrammatic view of another embodiment of the motor control system; and, FIG. 5 is a flow chart of the software used in the present invention.

An alternate embodiment for performing the selecting means 60 is shown in FIG. 4. The alternate selecting means includes a plurality of multiple pole switches 86,88 and 90, each having a contactor and first, second, and third poles. The switches 86,88 and 90 are each connected in the order of descending priority and are positioned normally in a first position at which a contactor is connected across the first and second pole. Each of the second poles of the switches 86,88 and 90 are connected to the first pole of the adjacent switch of immediately lesser priority. For example, the second pole of the switch 86 is connected to the first pole of the switch 88 and the second pole of the switch 88 is connected to the first pole of the switch 90.

Each of the switches 86,88 and 90 are movable to a second position at which the contactor is connected across the first and third pole. Each third pole is connected to each respective converting means 62 through resistors R66,R67 and R68. Each third pole of the switches 86,88 and 90 are additionally connected through each respective diode 92,94 and 96 and a resistor 98 to the base of a transistor 100. The transistor 100 connects system voltage to ground through a resistor 102. Each of the switches 86,88 and 90 are movable from the first position to the second position in response to actuation of their respective control levers 16,18 and 20.

Each of the respective converting means 62 receives the passed signal over the respective line 52,54,56 and 58 and delivers a preselected digital signal having a plurality of preselected magnitudes. This is accomplished by a plurality of sets of switches, each set of switches has a plurality of parallel connected switches and each set of switches is connected to the selecting means 60.

Figure 3:
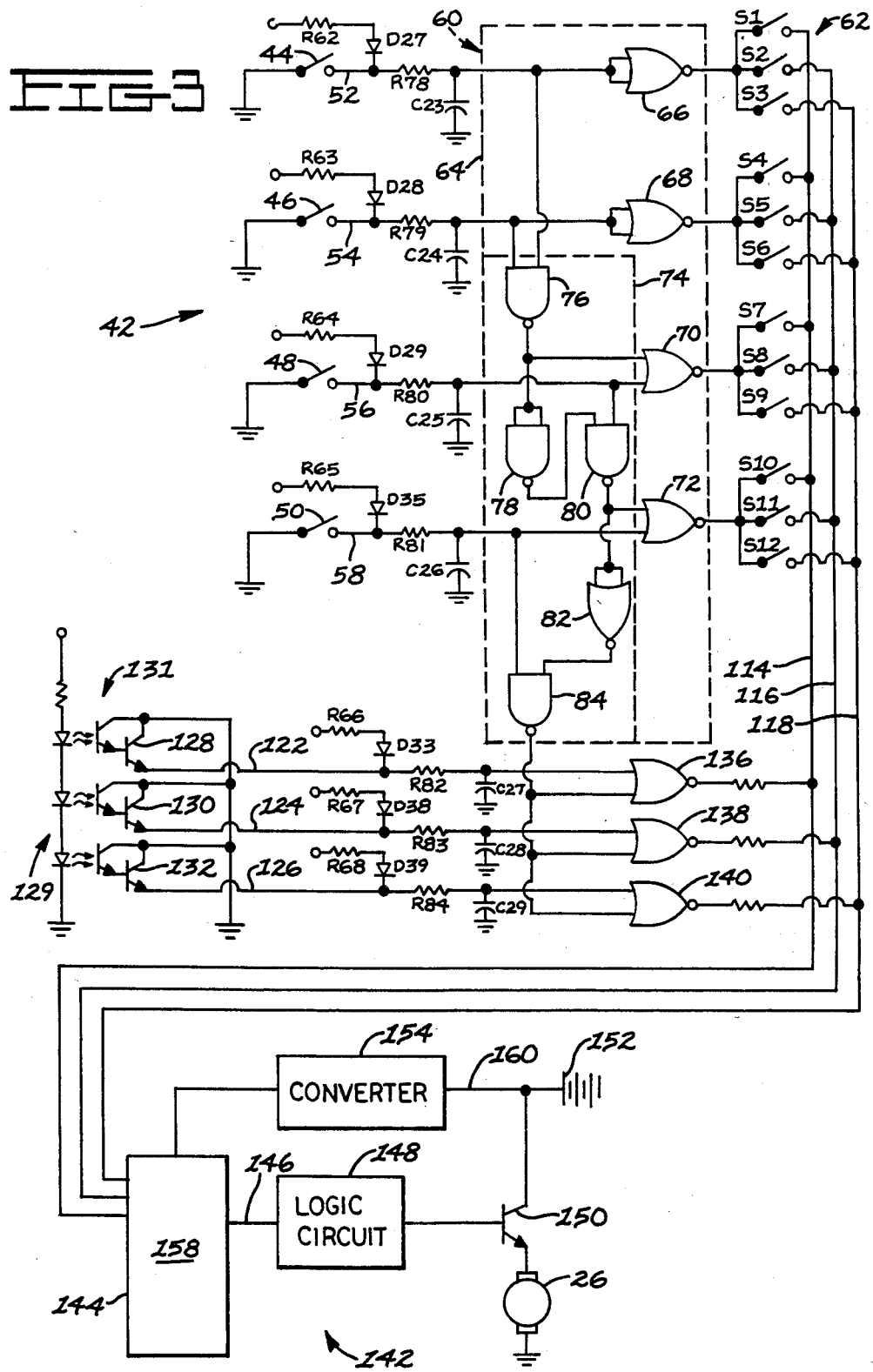
FIG. 3 is a diagrammatic view of one embodiment of the motor control system.

In the embodiment shown in FIG. 3, there are four sets of switches with each set having three parallel connected switches, S1-S3,S4-S6,S7-S9 and S10-S12. The converting means thereby delivers a three bit digital word over lines 114,116 and 118. The output of the NOR gate 66 is connected to a first pole of the switches S1,S2 and S3. Each of the second poles of the switches S1,S2 and S3 is respectively connected to the lines 114,116 and 118.

Digital signals are also delivered over the lines 114,116 and 118 by a special means 129 which is actuatable in response to the absence of the control signals on the lines 52,54,56 and 58 from the signal means 42. These digital signals are a plurality of preselected special digital signals of discrete preselected magnitudes responsive to incremental movement of the control lever 14. In this case, the special means 129 controls the lifting function of the mast 12 at a rate and direction proportional to the degree and direction of movement of the control lever 14. The degree of motion is detected, for example, by a group of three optical sensors 128,130 and 132 whose light sources are interruptible in eight distinct patterns by a means 131 connected to the control lever 14. Each of the optical sensors 128,130 and 132 include an optical signal means 129 for delivering an optical signal and an optical sensing means for receiving the optical signal. It should be understood that detection of the degree of motion of the control lever 14 can be by other than optical means, as is known in the art, without departing from the invention.

The lines 114,116 and 118 are connected to a means 142 for controlling the speed of the pump motor 26 in response to receiving the digital signals. The controlling means 142 includes a programmed data processor 144, preferably a microprocessor 158, for converting the digital signals on the lines 114,116 and 118 to a pulse train of variable duty cycle. The pulse train is delivered over a line 146 to a logic circuit 148 and the logic circuit 148 delivers an amplified pulse train to the base of a power transistor 150. The power transistor is connected in series with the pump motor 26 and a battery 152.

The optical sensors 128,130 and 132 are respectively connected to lines 122,124 and 126 and connect the lines 122,124 and 126 to ground when not interrupted by the means 131 NOR gates 136,138 and 140 each have their first input connected to the lines 122,124 and 126, respectively. Each of the lines 122,124 and 126 have respective associated pull up resistors R66,R67 and R68, protection diodes D33,D38 and D39, current limiting resistors R82,R83 and R84, and capacitors C27,C28 and C29. The second inputs to the NOR gates 136,138 and 140 are connected to the second plurality of logic gates 74 responsible for determining priority of the control levers 14,16,18 and 20. Specifically, the output of the NAND gate 84 is connected to the second inputs of the NOR gates 136,138 and 140.

Additionally, the microprocessor 158 has a second input connected to a converting means 154 over a line 156. The converting means 154 is also connected to the battery 152 by a line 160. The converting means 154 can be other devices for converting an analog signal to a representative digital number, proportional frequency, ratiometric pulse width, or other signal form suitable for use by the microprocessor 158.

The second embodiment of the present invention, shown in FIG. 4, has a means 162 for protecting a group of controllable transistors Q4,Q5 and Q6. The output of a monostable multivibrator 164 is connected to the first inputs of AND gates 166,168 and 170. The lines 14,16 and 18 are respectively connected to the second inputs of the AND gates 166,168 and 170. The outputs of the AND gates 166,168 and 170 are connected to the bases of respective transistors Q4,Q5 and Q6 through resistors 172,174 and 176. A transistor Q2 has its base connected to ground through a shunt resistor 178 and also connected to the emitters of the transistors Q4,Q5 and Q6. The transistor Q2 has its emitter connected to ground and its collector connected to the first input of a NOR gate 180. The second input of NOR gate 180 is connected to ground and its output is connected to the input of the monostable multivibrator 164. The collectors of the transistors Q4,Q5 and Q6 are connected to the microprocessor 158 through current limiting resistors 182,184 and 186 and to system voltage through pull up resistors 188,190 and 192.

Figure 5:
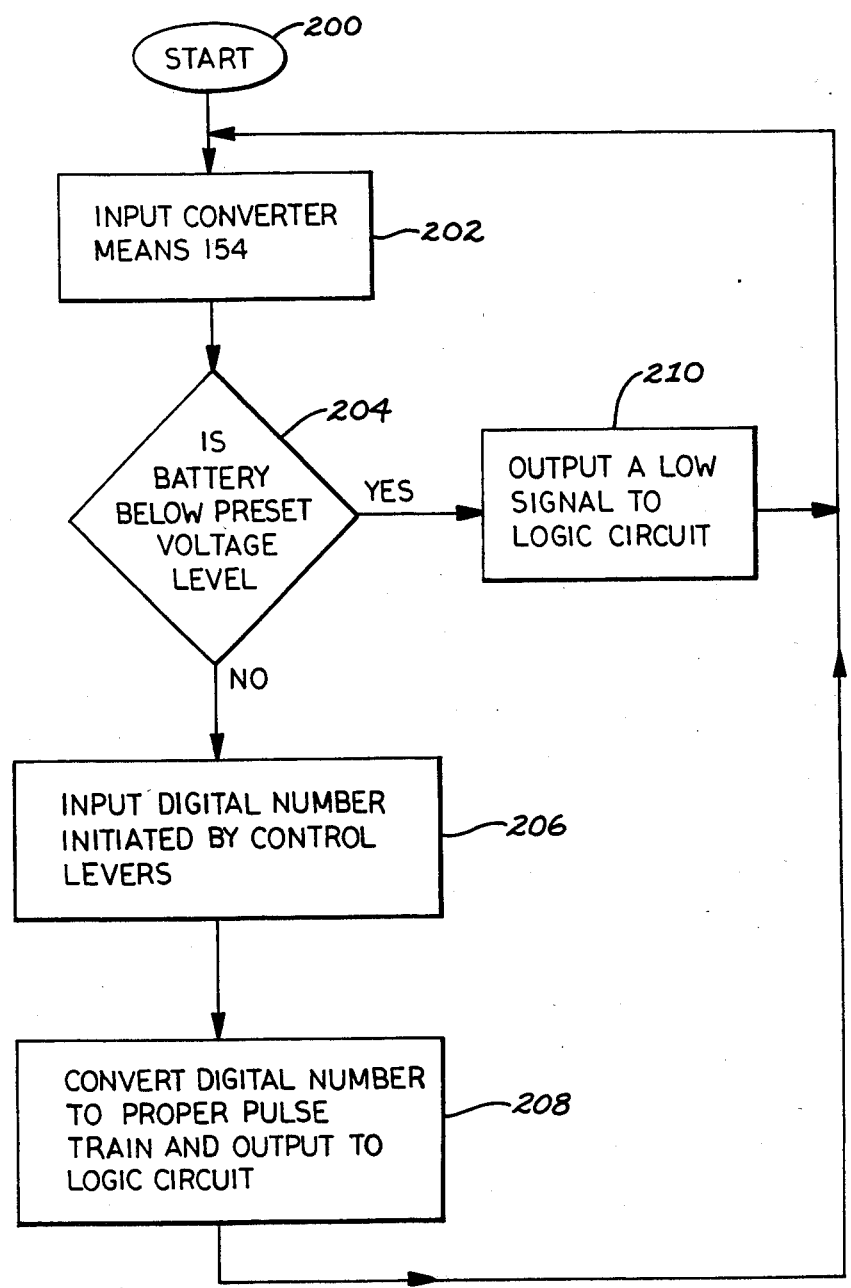

FIG. 5 is a flow chart of a computer program suitable for controlling the pump motor controlling means 142. Only the software routine required to implement one embodiment of the present invention is described. Sufficient detail is presented to allow one skilled in computer programming to write the required program to implement the flow chart for any common microprocessor, for example, the microprocessor produced by MOSTEK Corporation of Carrollton, Tex. and designated by the part number 3870. Upon beginning the flow chart at the block 200 labeled START, program control progresses through the following sequence:

In the block 202, a signal representative of the battery voltage level is received from the converting means 154 and stored as a binary number. In the block 204, the binary number representative of the battery voltage level is compared to a preselected binary number representative of a minimum allowable battery voltage. If the actual battery voltage is less than the minimum allowable battery voltage, then control is passed to the block 210 where a low signal is delivered to the control circuit 148 effectively disconnecting the battery 152 from the pump motor 26. The block 210 then passes control back to the block 202 and the process repeats.

If, in the block 204, the actual battery voltage level is greater than the minimum allowable voltage level, then control passes to the block 206. In the block 206, a digital number is received on the lines 114,116 and 118 in response to movement of one of the control levers 14,16,18 and 20. Control is consequently passed to the block 208 where the length of the pulse is determined from either a look up table or a mathematical equation using the digital number received on the lines 114,116 and 118 and the pulse train is output to the logic circuit 148. The length of the pulse is directly proportional to the speed of the pump motor. This is due to a higher duty cycle caused by holding the low period of the pulse train constant and increasing the high period of the pulse train. Control is then returned to the block 202 and the cycle is repeated.

Industrial Applicability

In the overall operation of the work vehicle 10 and the hydraulic pump motor control 142, assume, that the operator is actuating the control lever 18. In response to the switch 48 being closed, the NOR gate 70 provides a high digital signal to the switches S7,S8 and S9. One or more of the switches S7,S8 and S9 are closed to provide digital signals on the lines 114,116 and 118. These digital signals represent binary numbers in the range from 000 to 111, where 000 represents zero speed, 111 represents full speed, and all sequential numbers between 000 and 111 represent incremental increases from greater than zero speed to less than full speed. The microprocessor 158 operates under software control and produces a pulse train with a duty cycle proportional to the digital number on the lines 114,116 and 118.

The pulse train is amplified by the logic circuit 148 and biases the power transistor 150 on and off, thereby connecting the pump motor 26 to the battery 152. The pump motor 26 then operates the hydraulic pump 30 at a speed relative to the on time of the power transistor. Hydraulic fluid is supplied through the valve 38 and to the hydraulic cylinder at the requested rate.

If, at this time, the operator actuates the control lever 20, then the capacitor C26 discharges through the resistor R81 and the switch 50 to ground and provides a low signal to NOR gate 72. But, the prioritizing logic gates 74 provide a signal to the second input of the NOR gate 72 to disable the output of the NOR gate 72. Therefore, irrespective of the condition of the switches S10,S11 and S12, the digital signals on the lines 114,116 and 118 are unchanged. It can be seen that operating two of the levers 14,16,18 and 20 simultaneously results in the pump motor operating at the speed requested by the lever 14,16,18 and 20 of higher priority.

If the operator actuates the control lever 16 in a first direction so as to close the switch 44, then the NAND gate 76 provides a signal that causes the NOR gate 70 to become low. Alternately, the NOR gate 66 delivers a high signal that provides a binary number on the lines 114,116 and 118 corresponding to the setting of the switches S1,S2 and S3. The pump motor 26 is now pulsed at a rate corresponding to the digital number initiated by the control lever 16 rather than the control lever 18.

Operation of the lift lever 14 is slightly different from the other levers 16,18 and 20. If the operator actuates the lift control lever 14 in either of two directions, then a series of vanes moves so as to interrupt the light sources of the optical sensors 128,130 and 132 in one of eight three bit patterns. This three bit pattern is delivered to the microprocessor 158 through the NOR gates 136,138 and 140, assuming that none of the other levers 16,18 and 20 are also being actuated. The microprocessor 158 uses this information the same way it used the binary numbers initiated by the other control levers 16,18 and 20 and delivers a pulse train to the logic circuit 148. Movement of the lift control lever 14 the same distance in either direction results in the same pump motor speed, while the valve 34 controls the direction of fluid flow to the hydraulic cylinder. Thus, the valve 34 controls the direction of lift and the distance the control lever 14 is moved controls the speed of the pump motor 26.

Other aspects, objects, and advantages of this invention can be obtained from a study of the drawings, the disclosure, and the appended claims.

I claim:

1. In a work vehicle (10) having a plurality of power elements (15,17,19 and 21) and associated control elements (14,16,18, and 20), each of said power elements (15,17,19 and 21) having a respective preselected priority, and a controllable motor (26) connected to a pump (30) supplying power to said power elements (15,17,19 and 21), the improvement comprising:
said control elements (14,16,18 and 20) being connected in parallel one relative to the other;
signal means (42) for delivering a respective control signal in response to actuating respective control elements (16,18 and 20);
means (60) for receiving said control signals, selectively passing the control signal of the power element (15,17,19 and 21) requiring the slowest motor speed, and blocking all other received control signals;
converting means (62) for receiving said passed signal and delivering a preselected digital signal having a plurality of preselected magnitudes;
a special power element (15) having an associated control element (14);
special means (129) actuatable in response to the absence of control signals from the signal means (42) for delivering a plurality of preselected special digital signals of discrete preselected magnitudes responsive to incremental movement of said special control element (14); and
means (142) for controlling the speed of said pump motor (30) in response to receiving said digital signals and said special digital signals.

2. In a work vehicle (10), as set forth in claim 1, wherein said selecting means (60) includes a first plurality of logic gates (64), each gate having at least one input connected to said signal means (42) and an output connected to the converting means (62).

3. In a work vehicle (10), as set forth in claim 2, wherein said selecting means (60) includes a second plurality of logic gates (74), a portion of said second logic gates (74) each having an output connected to at least one of said first logic gates (64), and inputs connected to at least one of the signal means (42).

4. In a work vehicle (10), as set forth in claim 1, wherein said selecting means (60) includes a second plurality of logic gates (74), a portion of said logic gates (74) each having an output connected to at least one of said first logic gates (64), and inputs connected to at least one of the signal means (42).

5. In a work vehicle (10), as set forth in claim 1, wherein said selecting means (60) includes a plurality of multiple pole switches (86,88 and 90) each having a contactor and first, second and third poles, said switches (86,88 and 90) being connected in the order of descending priority and positioned normally in a first position at which a contactor is connected across a first and second pole, each second pole of said switches (86,88 and 90) being connected to the first pole of the adjacent switches (86,88 and 90) being of immediately lesser priority, each of said switches (86,88 and 90) being movable to a second position at which the contactor is connected across a first and third pole, each third pole of said switches (86,88 and 90) being connected to each respective converting means (62), and each of said switches (86,88 and 90) being movable from said first position to said second position in response to actuation of the respective control element (14,16 and 18).

6. In a control system (24), as set forth in claim 1, wherein said converting means (62) includes a plurality of sets of switches (S1-S3,S4-S6,S7-S9 and S10-S12), each set of switches (S1-S3,S4-S6,S7-S9 and S10-S12) having a plurality of parallel connected switches (S1-S12) and each set of switches (S1-S3,S4-S6,S7-S9 and S10-S12) being connected to the respective selecting means (60).

7. In a work vehicle (10), as set forth in claim 1, wherein said controlling means (142) includes a programmed data processor (144).

8. In a work vehicle (10), as set forth in claim 1, including means (162) for blocking said digital signals in response to detecting an overvoltage input to said controlling means (142).

9. In a work vehicle (10), as set forth in claim 1, including a battery (152) connected to said controllable motor (26);
means (154) for measuring the voltage level of said battery (152); and,
means (150) for disconnecting said battery (152) from said controllable motor (26) in response to said voltage level being below a preselected minimum value.

10. In a work vehicle having a plurality of power elements and associated control elements, each of said power elements having a respective preselected priority, comprising:
said control elements being connected in parallel one relative to the other;
a controllable motor;
a pump connected to said controllable motor, said pump being adapted for supplying power to said power elements;
signal means for delivering a respective control signal in response to actuating respective control elements;
a first plurality of logic gates, each gate having at least one input connected to said signal means;
a second plurality of logic gates, a portion of said second logic gates each having an output connected to at least one of said first logic gates, and inputs connected to at least one of the signal means;
a plurality of sets of switches, each set of switches having a plurality of parallel connected switches, and each set of switches being connected to the first plurality of logic gates, said switches being adapted for delivering a plurality of preselected digital signals;
a special power element having an associated control element;
special means actuatable in response to the absence of control signals from the signal means for delivering a plurality of preselected special digital signals of discrete preselected magnitudes responsive to incremental movement of said special control element; and
means for controlling the speed of said pump motor in response to receiving said digital signals and said special digital signals.

* * * * *